United States Patent [19]

Imanaga et al.

[11] Patent Number: 5,088,863
[45] Date of Patent: Feb. 18, 1992

[54] TWIST DRILL

[75] Inventors: Koujiro Imanaga; Shinichi Nakamura; Hideji Hosono; Yoshiyuki Yanase, all of Gifu, Japan

[73] Assignee: Mitsubishi Materials Corporation, Tokyo, Japan

[21] Appl. No.: 605,353

[22] Filed: Oct. 30, 1990

Related U.S. Application Data

[62] Division of Ser. No. 283,916, Dec. 13, 1988, Pat. No. 4,983,079.

[30] Foreign Application Priority Data

| Dec. 14, 1987 | [JP] | Japan | 62-315501 |
|---|---|---|---|
| Dec. 14, 1987 | [JP] | Japan | 62-315502 |
| Dec. 17, 1987 | [JP] | Japan | 62-319509 |
| Dec. 22, 1987 | [JP] | Japan | 62-324589 |
| Jul. 19, 1988 | [JP] | Japan | 63-180005 |
| Jul. 20, 1988 | [JP] | Japan | 63-180494 |
| Jul. 22, 1988 | [JP] | Japan | 63-183275 |
| Jul. 22, 1988 | [JP] | Japan | 63-183277 |
| Jul. 25, 1988 | [JP] | Japan | 63-184818 |
| Jul. 28, 1988 | [JP] | Japan | 63-188650 |
| Jul. 28, 1988 | [JP] | Japan | 63-188651 |

[51] Int. Cl.⁵ ............................................. B23B 51/02
[52] U.S. Cl. .................................... 408/230; 408/144
[58] Field of Search ................ 408/227, 144, 230, 145

[56] References Cited

U.S. PATENT DOCUMENTS

| 4,583,888 | 4/1986 | Mori et al. | 408/144 |
|---|---|---|---|
| 4,983,079 | 1/1991 | Imanaga et al. | 408/230 |

FOREIGN PATENT DOCUMENTS

| 106709 | 8/1980 | Japan | 408/230 |
|---|---|---|---|
| 114407 | 6/1985 | Japan | 408/230 |
| 177809 | 9/1985 | Japan | 408/230 |
| 58246 | 12/1986 | Japan | 408/230 |

Primary Examiner—Daniel W. Howell
Attorney, Agent, or Firm—Cushman, Darby & Cushman

[57] ABSTRACT

A twist drill includes a cylindrical body having an axis of rotation therethrough and having a forward end which contacts a workpiece. The body has a spiral flute formed in an outer peripheral surface thereof so as to extend spirally along a length thereof to the forward end and a land disposed adjacent to the flute. The flute has a first wall facing in the direction of rotation of the body and a second wall extending from an inner end of the first wall to the outer periphery of the body. The first wall terminates at the forward end in a first cutting lip having a radially outermost end disposed on the outer periphery of the body. The second wall is concavely shaped when viewed from the forward end and formed so that, assuming a first line extending from the outermost end perpendicular to a second line which connects the outermost end and the axis of the body, the maximum distance between the first line and the second wall is set to range between 0.45D and 0.65D, wherein D is a diameter of the body.

21 Claims, 9 Drawing Sheets

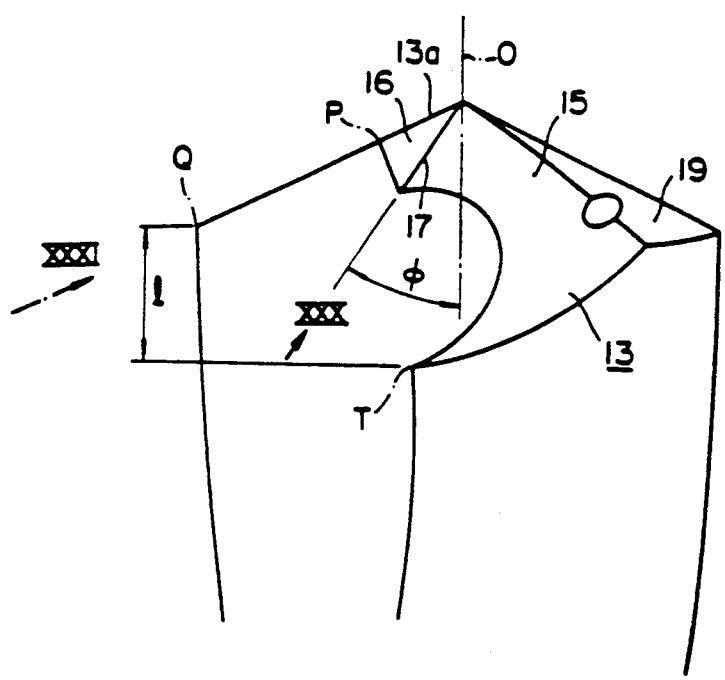
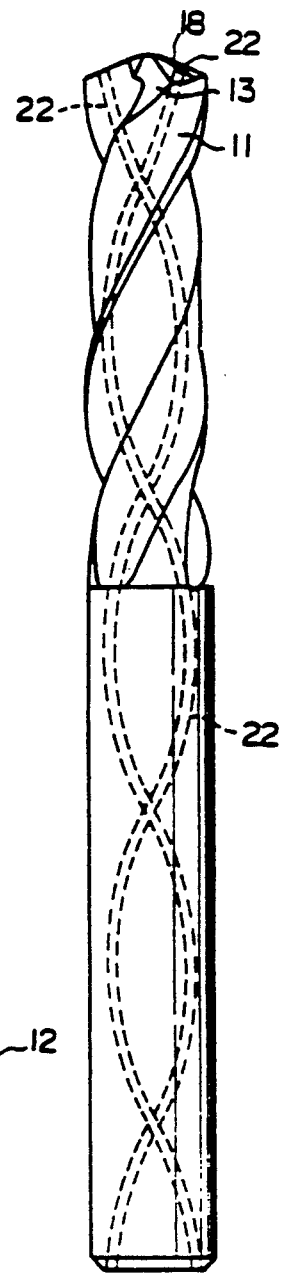
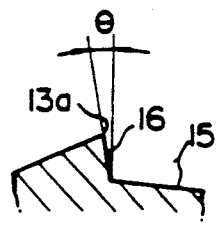
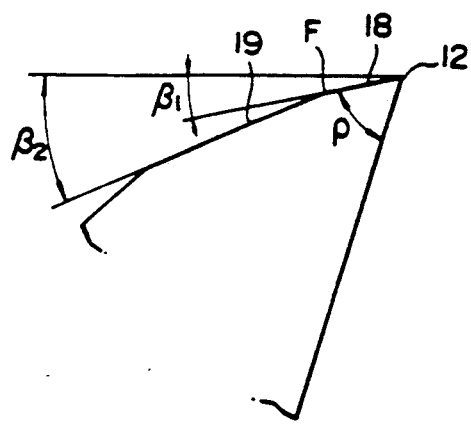
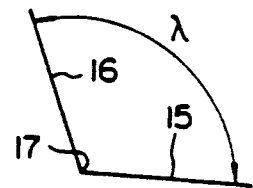

TWIST DRILL

This is a division of application Ser. No. 07/283,916, filed Dec. 13, 1988, now U.S. Pat. No. 4,983,079.

BACKGROUND OF THE INVENTION

1. Field of the Invention

The present invention pertains generally to twist drills made of high speed steel (HSS), sintered metal HSS, cemented carbide or cermet, and in particular to improvements to reduce cutting resistance exerted thereon during drilling operation.

2. Prior Art

Twist drills made of HSS or sintered metal HSS have hitherto been developed as drills for effecting heavy-duty drilling operations. FIGS. 1 and 2 depict a conventional twist drill of such type which has a cylindrical body 1, a pair of spiral grooves or flutes 2 formed in the outer peripheral surface of the body 1 and a pair of lands each disposed between the pair of flutes 2. That wall portion of each flute 2 facing in the direction of rotation of the body 1 terminates at the forward end in a cutting edge or lip 3. Each spiral flute 2 is so formed that its wall is concavely shaped. In the drill for heavy-duty operations, the web thickness T of the drill body 1 is made greater than a HSS drill for normal drilling operations so that it is about 30% of the drill diameter, while the flute-width ratio at the forward end defined by the arc length A of the flute to the arc length B of the land is set to be about 0.7. Furthermore, at a cross-section of the drill, away from the forward end, the ratio of the arc length $A_1$ of the flute of the arc length $B_1$ of the land is set to about 1.16. With this construction, the torsional rigidity of the body 1 of the twist drill is considerably enhanced.

Furthermore, twist drills formed of cemented carbide or cermet have also been extensively employed for heavy-duty drilling operations. Such drills are superior in wear resistance to HSS drills, but, due to the inferior mechanical strength, e.g., transverse rupture strength, a greater web thickness and smaller flute-width ratio are necessary. FIGS. 3 and 4 illustrate a prior art drill of such type as disclosed in Examined Japanese Patent Application Publication No. 61-30845, in which the symbols in common with those in FIGS. 1 and 2 denote the same or like parts. In this drill, the web thickness T and the flute-width ratio A/B are set to range between 20 and 35% of the drill diameter and between 0.4 and 0.8, respectively, while the flute-width ratio $A_1/B_1$ at a cross-section away from the forward end is approximately 0.6.

In the twist drills of the afore-described types, however, there is always problem that the drill body 1 is susceptible to breakage when subjected to heavy-duty drilling operations.

More, specifically, chips or cuttings produced by the cutting lips 3 during a drilling operation are produced as if a sector-shaped folding fan were opened since their outer sides grow faster than the inner sides, and curl at their tip ends by the bottom 2a of the flute 2, i.e., by that portion of the flute wall where the distance between a line L perpendicular to a radial line N, connecting the axis O of the body 1 to a radially outermost end Q of the cutting lip 3, and the flute wall is greatest, so that the chips are broken at their roots by the resistance caused due to the curling. The chips thus formed are illustrated in FIG. 5, and are classified as "transition curled fractured type chips". In the above twist drills, the distance W between the line L and the bottom 2a of the flute 2 is made rather small in order to enhance torsional rigidity. As a result, the force exerted on the chips by the bottom 2a of the flute 2 acts in the direction opposite to the direction in which they grow, and hence thick chips, compressed strongly in the longitudinal direction, are produced. The addition of the relatively large force on the chips causes the drill body 1 to be subjected to a great cutting torque and thrust load.

Furthermore, in the above twist drills, the cross-sectional area of the flute 2 away from the forward end, which serves to discharge the chips, is rendered inevitably smaller, so that the chips may be jammed therein. This often causes the drill to break when the heavy-duty drilling operation is effected.

SUMMARY OF THE INVENTION

It is therefore a primary object of the invention to provide an improved twist drill which is less susceptible to breakage during heavy-duty drilling operations.

Another object of the invention is to provide a twist drill which can reduce the cutting resistance substantially by curling chips easily, and ensuring a smooth discharge of the chips through flutes during the drilling operation.

According to the present invention, there is provided a twist drill comprising a cylindrical body having an axis of rotation therethrough and having a forward end which contacts a workpiece, the body having a spiral flute formed in an outer peripheral surface thereof so as to extend spirally along a length thereof to the forward end and a land disposed adjacent to the flute, the flute having a first wall facing in the direction of rotation of the body and a second wall extending from an inner end of the first wall to the outer periphery of the body, the first wall terminating at the forward end in a first cutting lip having a radially outermost end disposed on the outer periphery of the body, the second wall being concavely shaped when viewed from the forward end and formed so that, assuming a first line extending from the outermost end perpendicular to a second line which connects the outermost end and the axis of the body, the maximum distance between the first line and the second wall is set to range between 0.45D and 0.65D wherein D is a diameter of the body.

BRIEF DESCRIPTION OF THE DRAWINGS

FIG. 27 is a view as seen from the direction designated by XXVII in FIG. 25, but showing a further modified drill in accordance with a sixth embodiment of the present invention;

FIG. 28 is a side elevation of the drill of FIG. 27;

FIG. 29 is a cross-sectional view of the drill of FIG. 27 taken along the XXIX—XXIX in FIG. 25;

FIG. 30 is a view of a part of the drill of FIG. 27 as seen from the direction designated by the arrow XXX in FIG. 27;

FIG. 31 is a veiw of a part of the drill of FIG. 27 as seen in the direction designated by the arrow XXXI in FIG. 27;

DESCRIPTION OF THE PREFERRED EMBODIMENTS OF THE INVENTION

Figure 6:
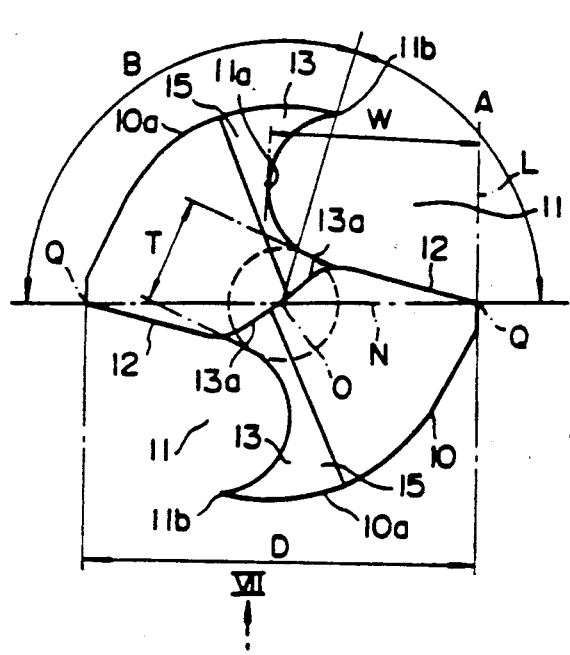
FIG. 6 is a forward end view of a twist drill provided in accordance with a first embodiment of the present invention.
Figure 7:
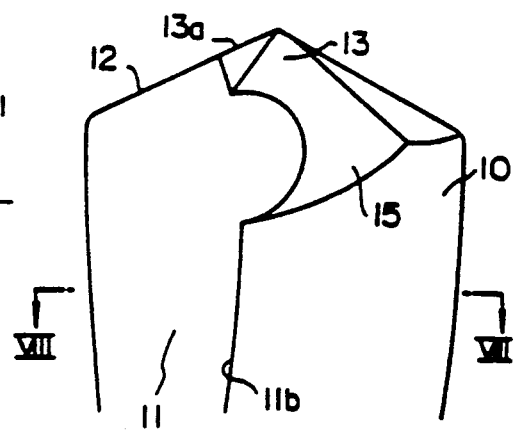
FIG. 7 is a side elevation of the drill of FIG. 6 as seen from the direction indicated by the arrow VII in FIG. 6.
Figure 8:
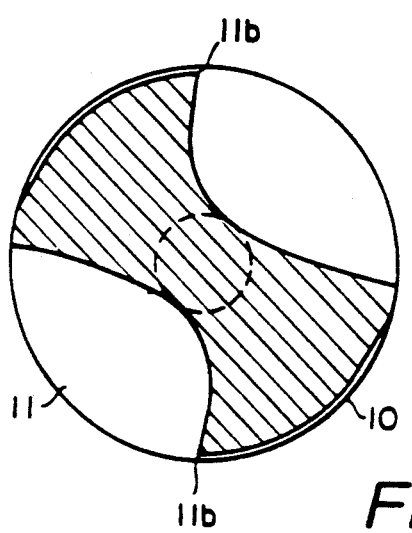
FIG. 8 is a cross-sectional view of the drill of FIG. 6 taken along the line VIII—VIII in FIG. 7.

In FIGS. 6 to 8, there is illustrated a twist drill in accordance with a first embodiment of the present invention. The drill includes a cylindrical body 10 of high speed steel (HSS) or sintered metal HSS having an axis O of rotation therethrough and a forward end which contacts a workpiece. The body 10 has a pair of spiral flutes 11 formed in the outer peripheral surface of the body and extending spirally along its length to the forward end, and a pair of lands 10a each disposed between the pair of flutes. Each flute 11 has a first wall facing in the direction of rotation of the body 10 and extending from the outer periphery of the body 10 generally radially inwardly and a second wall extending from an inner end of the first wall to the outer periphery of the body 10. Each of the first walls terminates at the forward end in a first or primary cutting lip 12 which has a radially outermost end Q disposed on the outer periphery of the body 10. Each second wall is a smooth continuation of the first wall and is concavely shaped when viewed from the forward end. In order to provide a greater torsional rigidity of the body, the body 10 has a web thickness T of 15 to 30% of the drill diameter D and a flute-width ratio A/B of 0.4 to 0.9. Those portions of relief surfaces or flanks disposed rearwardly with respect to the direction of rotation of the body 10 are ground off, as at 13, to provide cross- or X-type ground surfaces 15, and hence second cutting lips 13a, extending away from the axis O of rotation to the radially innermost end of a respective first cutting lip 12, are formed at the web portion.

Furthermore, consider a line N connecting the axis O of the body 10 and the radially outermost end Q of the cutting lip 12 and a line L extending from the radially outermost end Q of the cutting lip 12 perpendicular to the line N in an end view seen from the forward end of the body. Then, the distance W between the line L and the bottom 11a of the flute 11, i.e., the maximum distance between the line L and the wall of the flute 11, is made to range from 45 to 65% of the drill diameter D. With this arrangement, the spiral flute 11 is so shaped that the second wall, including the bottom 11a, is deeply recessed in the direction of rotation of the body 10. Additionally, the entire surface of the drill body 10 is coated with a hard coating composed of at least one material selected from the group consisting of TiC, TiN, TiCN and $Al_2O_3$. Such a coating may be made of carbide, nitride or carbo-nitride of other metal selected from Group IVa of the Periodic Table, and may be limited to the forward end of the body 10.

Figure 1:
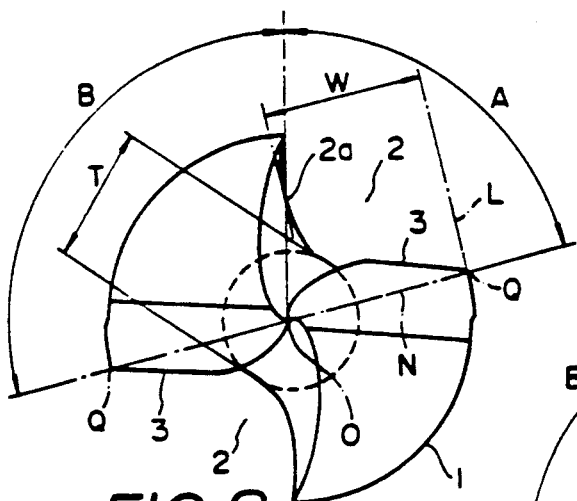
FIG. 1 is a forward end view of a conventional twist drill.
Figure 2:
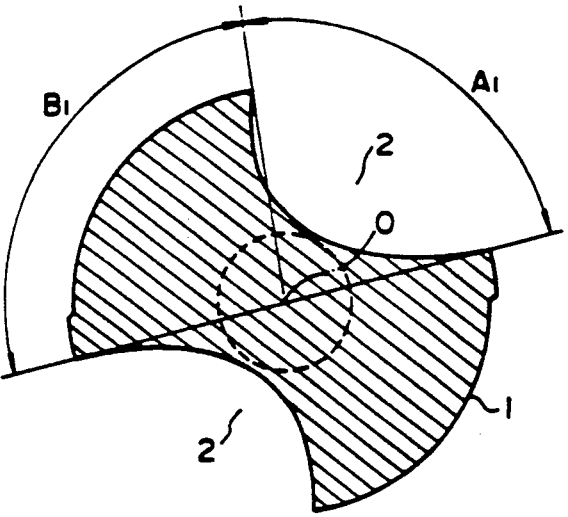
FIG. 2 is a cross-sectional view of the drill of FIG. 1.
Figure 3:
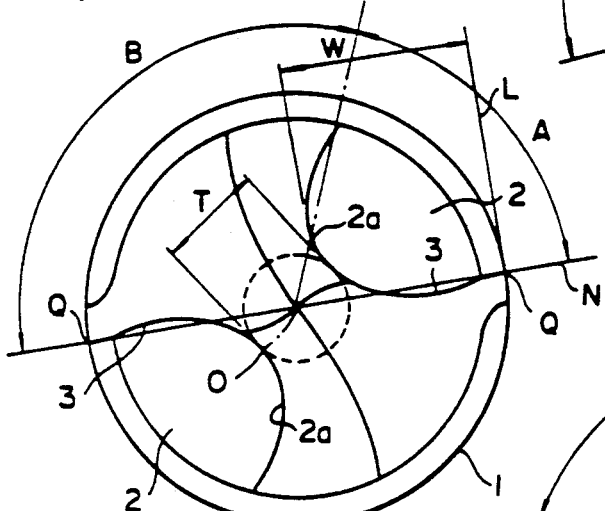
FIG. 3 is a view similar to FIG. 1, but showing a different conventional twist drill.
Figure 4:
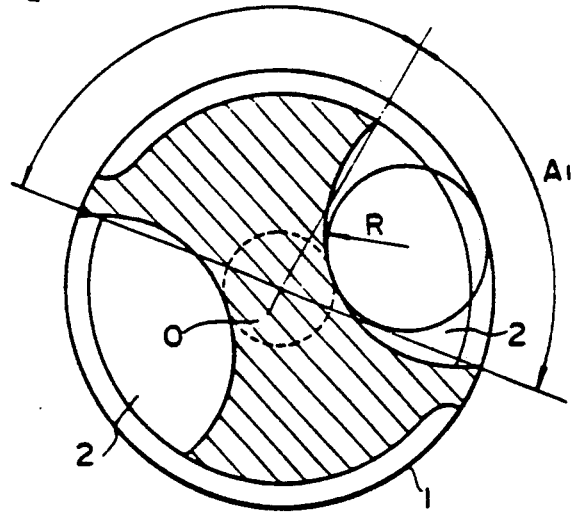
FIG. 4 is a cross-sectional view of the dril of FIG. 3.
Figure 5:
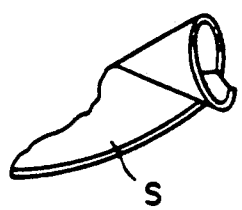
FIG. 5 is a view showing a chip produced during a drilling operation.

In the twist drill as described above, a chip produced by the cutting lip 12 grows and is curled at the bottom 11a of the flute 11, so that it is broken into pieces of a transition curled fractured type as illustrated in FIG. 5. Inasmuch as the distance W between the line L and the bottom 11a of the flute 11 is set to be no less than 45% of the drill diameter, the freedom of the chip to curl inwards is greater than for conventional drills. As a result, the resistance exerted on the chip in the direction opposite to the direction in which the chip grows is divided into forces to cause the chip to bend or to buckle. Accordingly, the load on the chip is not as great as for conventional drills so that the thrust load and cutting torque can be greatly reduced.

These points were verified by way of the following drilling tests.

DRILLING TEST 1

There were prepared several twist drills having various ratios of the distance W to the drill diameter. The test had a diameter of 12 mm and a point angle of 140°, and the radial rake angle of the cutting lip was −15°. The drilling tests were conducted under the following conditions:

Cutting speed: 35 m/min.

Workpiece: Steel (JIS SCM440; Hardness:H$_B$100) Feed rate: 0.15, 0.25, 0.35, 0.45 and 0.55 mm/revolution The thicknesses of chips produced during the drilling operation using the above various drills were measured at a point designated by S in FIG. 5. The results are shown in Table 1.

TABLE 1

| Feed rate (mm/rev.) | Thickness of chips (mm) | | | | |
|---|---|---|---|---|---|
| | Drills of the invention Ratio (%) | | | Prior art drills Ratio (%) | |
| | 53 | 50 | 45 | 43 | 41 |
| 0.15 | 0.261 | 0.293 | 0.309 | 0.423 | 0.445 |
| 0.25 | 0.355 | 0.369 | 0.387 | 0.528 | 0.542 |
| 0.35 | 0.427 | 0.440 | 0.466 | 0.634 | 0.654 |
| 0.45 | 0.524 | 0.525 | 0.553 | 0.756 | 0.789 |
| 0.55 | 0.650 | 0.658 | 0.698 | 0.955 | 0.997 |

As will be seen from Table 1, when the ratio, i.e. the distance W from the line L to the bottom 11a of the flute 11, is no less than 45% of the drill diameter, the thicknesses of the chips are reduced substantially. This means that the resistance exerted on the chip can be substantially reduced by setting the distance W to be no less than 45% of the drill diameter.

DRILLING TEST 2

The drill having a distance W of 53% of the drill diameter and the drill having a distance W of 41% of the drill diameter, both of which were prepared for Drilling Test 1, were again used, and the drilling tests were conducted under the same conditions as those in Drilling Test 1. In this test, the thrust load, cutting torque, cutting power and maximum amplitude of vibration of the spindle during the drilling operation were measured. The results are shown in Table 2.

TABLE 2

| | Feed rate (mm/rev.) | | | | |
|---|---|---|---|---|---|
| | 0.15 | 0.25 | 0.35 | 0.45 | 0.55 |
| Thrust load (Kg) | | | | | |
| Drill of the invention | 120 | 164 | 208 | 308 | 356 |
| Prior art drill | 216 | 280 | 352 | 416 | 480 |
| Cutting torque (Kg · mm) | | | | | |
| Drill of the invention | 80 | 116 | 152 | 236 | 268 |
| Prior art drill | 116 | 184 | 218 | 264 | 354 |
| Cutting power (Kw) | | | | | |
| Drill of the invention | 0.45 | 0.68 | 0.86 | 1.22 | 1.39 |
| Prior art drill | 0.74 | 1.19 | 1.37 | 1.62 | 2.07 |
| Amplitude of vibration of the spindle (μ) | | | | | |
| Drill of the invention | 3.0 | 2.64 | 2.64 | 2.76 | 2.34 |
| Prior art drill | 3.6 | 5.76 | 2.7 | 4.2 | 6.54 |

It is seen from Table 2 that in the drill of the invention, the thrust load, cutting torque and cutting power are all reduced markedly in comparison with the prior art drill. This is because, by the drill of this invention, chips can be easily curled without being deflected sharply, and the force exerted on the chips can be reduced.

As verified in the above drilling tests, for the twist drill in accordance with the present invention, the cutting resistance during drilling operations can be reduced significantly. In addition, since the distance between the line L and the bottom 11a of the flute 11 is set to be no greater than 65% of the drill diameter D, the thickness of the body 10 between the second wall of the flute near a heel 11b and the peripheral land 10a is adequate to avoid chipping damage or cracking, and high torsional rigidity of the drill can be maintained. Additionally, since the surface of the drill body is coated with TiC, TiCN or the like, wear resistance is sufficiently enhanced, and this enables heavy-duty operations to be performed.

Furthermore, as also seen from the results of the above drilling tests, the vibration of spindle of the machine tool is reduced. Accordingly, not only is the chipping damage of the cutting lip reduced, but also drilling precision is enhanced. Moreover, since the flute 11 is so formed that the wall portion including the bottom 11a is recessed deeply in the direction of rotation of the body, the cross-sectional area of the flute 11 is large, and hence chips can be smoothly removed.

Figure 9:
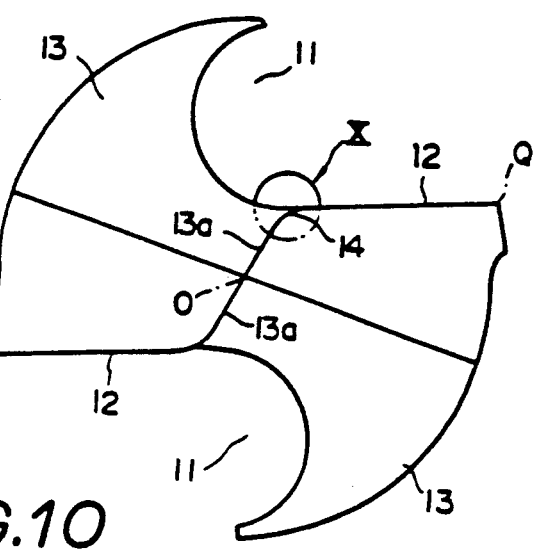
FIG. 9 is a forward end view of a modified twist drill in accordance with a second embodiment of the present invention.
Figure 10:
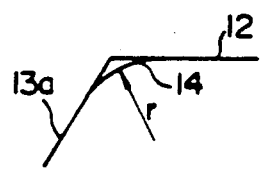
FIG. 10 is an enlarged view of the circled portion labeled as X in FIG. 9.

FIGS. 9 and 10 depict a twist drill in accordance with a second embodiment of the invention. In this drill, the first cutting lip 12 and the second cutting lip 13a, formed by the cross-thinning or X-thinning thinning as at 13, are formed so that when viewed from the forward end of the body 10, they are straight edges and the intersection 14 between the first cutting lip 12 and the second cutting lip 13a is curved at a prescribed radius of curvature r.

With this construction, the width of the chisel is rendered very small by the cross thinning, and hence the thrust load can be further reduced. In addition, since the first cutting lip 12 and the second cutting lip 13a are straight, the thickness of the chip becomes uniform in the transverse direction of the chip. For this reason, the chip tends to buckle easily when bent, so that it curls readily without being forced. Furthermore, since the intersection 14 of the first cutting lip 12 with the second cutting lip 13a is curved, chips are not prone to separation at the intersection 14, thereby preventing the jamming of the chip and hence the breakage of the drill.

In this illustrated embodiment, the radius of curvature r of the intersection 14 is set to satisfy the relationship $0.05\,D \leq r \leq 0.15\,D$. If the radius of curvature r exceeds 0.15 D, the effective portion of the cutting lip 12, which has a rake angle corresponding to the index angle of the flute 11, is unduly reduced, and cutting resistance is increased. On the other hand, if the radius of curvature r is less than 0.05 D, chipping damage or separation of the chip is apt to occur at the intersection 14.

FIGS. 11 to 18 illustrate a twist drill in accordance with a third embodiment of the invention. In this embodiment, when viewed from the forward end of the body, the first cutting lip 12 and the second cutting lip 13a are formed as straight edges intersecting each other at a sharp point P, and the following features are further added:

(1) An angle α, defined as the angle between the second cutting lip 13a and the radial line N which connects the axis O of rotation and the outermost end Q of the cutting lip 12 together as viewed from the forward end of the body 10, is set to range from 15° to 35°.

The above range is the optimal one for preventing chips from jamming and to improve chip removal efficiency. More specifically, that portion of a chip cut by the second cutting lip 13a and that portion of the chip cut by the first cutting lip 12 grow at different speeds from each other, so that as the chip is produced, it curls toward the center of the drill. If the above angle α exceeds 35°, the direction of growth of the portion of the chip cut by the first cutting lip 12 is greatly different from the direction of growth of the portion of the chip cut by the second cutting lip 13a. Therefore, the chip is liable to be separated at a position corresponding to the intersection of the first cutting lip 12 with the second cutting lip 13a. Furthermore, since the angle (α+δ), defined as the angle between the second cutting lip 13a and the first cutting lip 12, is rendered small, the cutting lips become susceptible to chipping damage at the intersection P.

On the other hand, if the angle α is less than 15°, the ratio of the length of the second cutting lip 13a with respect to the length of the first cutting lip 12, becomes large. Accordingly, the direction in which the chip grows is greatly affected by that portion of the chip cut by the second cutting lip 13a, so that required differential growth rate is not properly achieved. The longer second cutting lip 13a also causes the cutting resistance to increase.

(2) The radial rake angle δ of the cutting lip 12 at its outer end is set to range between −10° to −20°, and the ratio of a length $L_1$ between the axis O of rotation and the intersection P to a length $L_2$ between the intersection P and the outermost end Q of the cutting lip 12 is set to range between 0.4:1 and 0.7:1. These ranges are the optimal ones for reducing cutting resistance to prevent the jamming of chips. More specifically, if the ratio $L_1/L_2$ is less than 0.4, the second cutting lip 13a cuts a narrow portion of a chip from a workpiece, so that, due to the large force exerted on the narrow portion when extended into the spiral flute 11, the narrow portion separates from the portion of the chip cut by the cutting lip 12. On the other hand, if the ratio $L_1/L_2$ exceeds 0.7, the growth direction of the chip is greatly affected by that portion of the chip cut by the second cutting lip 13a, so that a somewhat elongated chip, different from the normal transition curled fractured type, is formed. The increase of the proportion of the second cutting lip 13a also causes the cutting resistance to increase.

Furthermore, if the radial rake angle δ exceeds −10°, then the angle (α+δ), defined as the angle between the cutting lip 12 and the second cutting lip 13a, becomes excessively small. As a result, the portions of chip do not interfere with each other, and the strength at the outermost end Q of the cutting lip 12 is unduly lowered. On the other hand, if the radial rake angle δ is less than −20°, the angle (α+δ), defined as the angle between the cutting lip 12 and the second cutting lip 13a, increases, and hence the chip becomes liable to divide into two pieces at the intersection 14 therebetween, and the cutting resistance is increased.

Figure 14:
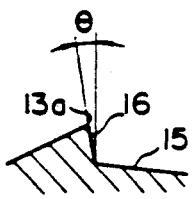
FIG. 14 is a cross-sectional view of a part of the drill of FIG. 11 taken along the line XIV—XIV in FIG. 11.

(3) An axial rake angle θ for the second cutting lip 13a is set to be from 0° to −5° (FIG. 14).

Since the axial rake angle θ for the second cutting lip 13a is negative, the ground surface can be left as a rake surface for the second cutting lip 13a when the drill is resharpened, so that resharpening can be easily effected. In addition, the strength of the second cutting lip 13a can be enhanced. However, if the axial rake angle θ is made too negative, the cutting resistance at the second cutting lip 13a increases. Therefore, the axial rake angle should be no more negative than −5°.

Figure 15:
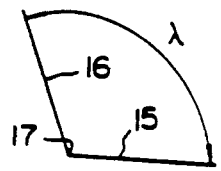
FIG. 15 is a view of the drill of FIG. 11 as seen from the direction indicated by the arrow XV in FIG. 12.

(4) An angle λ, defined as the angle between a ground surface 15 and a rake surface 16 disposed along the second cutting lip 13a, is set to be 95° to 115° (FIG. 15).

Since the portion of the chip produced by the second cutting lip 13a passes into the flute 11 after it reaches the ground surface 15, it undergoes a high force at that time. If the angle λ is less than 95°, the force exerted on the portion of the chip cut by the second cutting lip 13a is increased excessively, and hence that portion of the chip tends to separate from the portion of the chip cut by the cutting lip 12. Furthermore, inasmuch as the force exerted on the chip is large, the thrust load is increased. On the other hand, if the angle λ exceeds 115°, that portion of the drill body 10 adjacent to the heel is reduced too much, so that the chip will not be easily curled in the flute 11.

Figure 12:
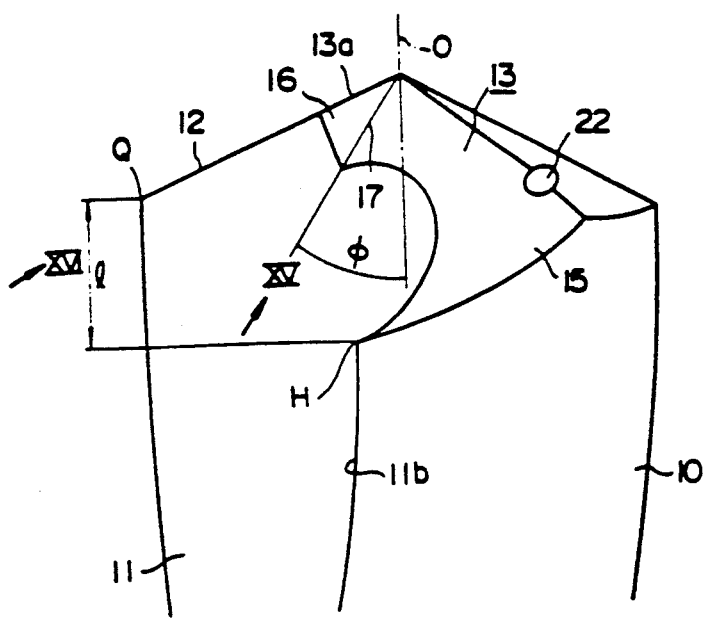
FIG. 12 is a view of a part of the drill of FIG. 11 as seen from the direction designated by XII in FIG. 11.

(5) A valley line 17 defined by the ground surface 15 and the rake surface 16 disposed along the second cutting lip 13a intersects with the axis O of the body 10 at an angle φ of 30° to 40° (FIG. 12).

If the angle φ exceeds 40°, the friction between the portion of the chip cut by the second cutting lip 13 and the ground surface 15 becomes great, so that the fragmentation of the chip as described above will occur and thrust load will increase. On the other hand, if the angle φ is set too small, an excess of the portion of the body 10 disposed adjacent to the heel is removed, and hence the angle should be no less than 30°. By setting the angle φ from 30° to 40°, separation of the portion of the chip cut by the second cutting lip 13a from the portion of the chip cut by the cutting lip 12 can be prevented, and the thrust load can be reduced substantially.

(6) An axial distance l between the outermost end Q of the cutting lip 12 and the outermost end H of the heel 11b is designed to be 0.3 D to 1.0 D (FIG. 12).

If the distance l is set to exceed 0.3 D, the fluid passage of cutting oil toward the cutting part is ensured. However, if the distance l exceeds 1.0 D, that portion of the body 10 adjacent to the heel will not be adequate.

Figure 11:
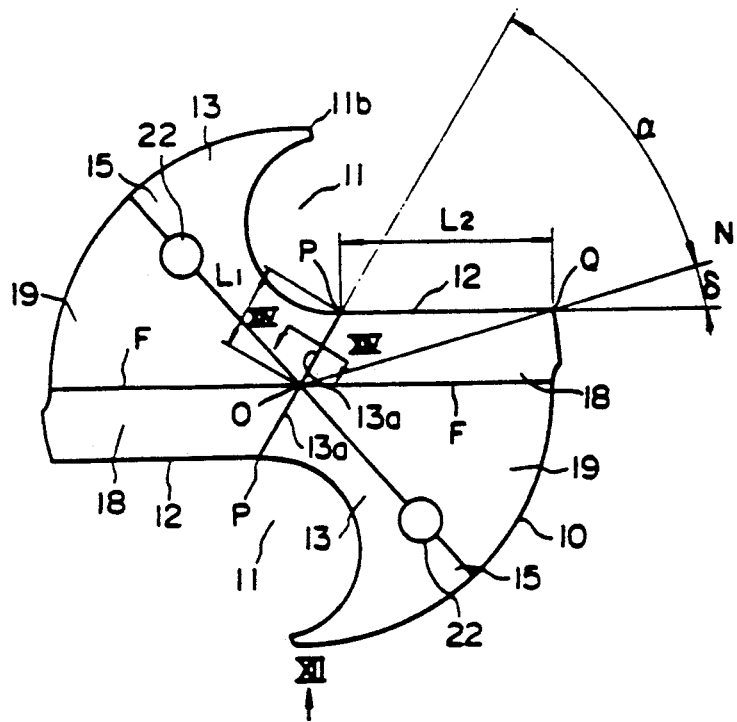
FIG. 11 is a forward end view of another modified twist drill in accordance with a third embodiment of the present invention.
Figure 16:
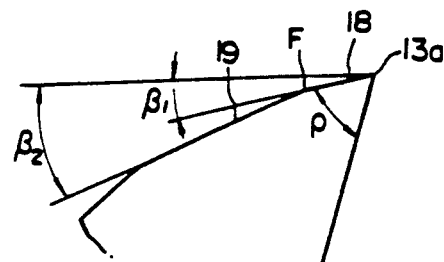
FIG. 16 is a view of the drill of FIG. 11 as seen from the direction indicated by the arrow XVI in FIG. 12.

(7) As shown in FIGS. 11 and 16, the drill body 10 includes first and second planar flanks 18 and 19 formed on the forward end face thereof. The first flank 18, which is provided with a relief angle $\beta_1$ of 7° to 15°, is disposed along the first cutting lip 12, while the second flank 19, which is provided with a relief angle $\beta_2$ greater than that of the first flank so as to range from 15° to 25°, is disposed along the first flank 18. That ridge at F, defined by the intersection of the first and second flanks 18 and 19, is parallel to the cutting lip 12 and intersects with the axis O of the body 10.

The provision of the second flank 19 is to prevent frictional engagement between it and the bottom of a drilled hole, and to ensure a fluid passage for cutting oil, so that the cutting part can be lubricated and cooled efficiently by the cutting oil. This is very advantageous for the HSS drill which is often used for heavy-duty drilling operations.

Moreover, since the first and second flanks 18 and 19 are formed to be planar, the first and second flanks can be resharpened by surface grinding. This ensures a better surface finish as compared with the conical sector grinding method which is conventionally used. In addition, since the grinding is easily conducted, minute chipping damage at the ridge lines such as the cutting lip 12 is prevented from occurring during the grinding. As a result, the service life of the drill can be extended and troubles such as early fracture can be avoided.

Furthermore, since the relief angle $\beta_1$ is set to be below 7°, flank wear can be effectively prevented. This feature is particularly effective in the case where a high-feed drilling operation is conducted. On the other hand, if the relief angle $\beta_1$ exceeds 15°, the included angle $\rho$ of the cutting lip 12 is reduced, so that the cutting lip 12 becomes susceptible to chipping or fracture.

Moreover, since the relief angle $\beta_2$ is no less than 15°, the fluid passage for supplying cutting oil to the cutting part can be sufficiently ensured, and the cooling and lubricating effect of the oil can be improved. On the other hand, to obtain sufficient rigidity at the cutting lip, it is preferable that the relief angle $\beta_2$ should be no greater than 25°.

In the above, the reason why the ridge F, defined as the intersection of the first and second flanks 18 and 19, is set to be parallel to the cutting lip 12 and to intersect with the axis O of the body is as follows.

Figure 18:
FIG. 18 is a view similar to FIG. 17, but showing a different arrangement of the chisel.

If the intersection ridge F is formed so that, as viewed from the forward end of the body 10, it is inclined in the direction of rotation of the body 10 with respect to the cutting lip 12, the width of the first flank 18 is reduced at its radially outer end portion, so that the rigidity of the cutting lip is unduly reduced at its outer portion. On the other hand, if the intersection ridge F is formed so that it is inclined in the direction opposite to the direction of rotation of the body 10 with respect to the cutting lip 12, the first flank 18 is enlarged in width at its outer end portion, so that a second impingement or flank-engagement tends to occur. Furthermore, if the intersection ridge F is formed so that it is inclined in the direction of rotation of the body 10, a chisel edge 20 with a greater chisel angle $\gamma$ is formed at the border between the two second flanks 19 as shown in FIG. 18, and hence the mechanical strength of the chisel edge 20 is lowered. Accordingly, it is preferable that the intersection ridge F should be formed so as to pass through the axis O or to be inclined in the direction opposite to the direction of rotation of the body 10. The first and second flanks can be precisely formed again upon the resharpening of the drill when the intersection ridge F is designed to intersect the axis O of the body 10.

Figure 17:
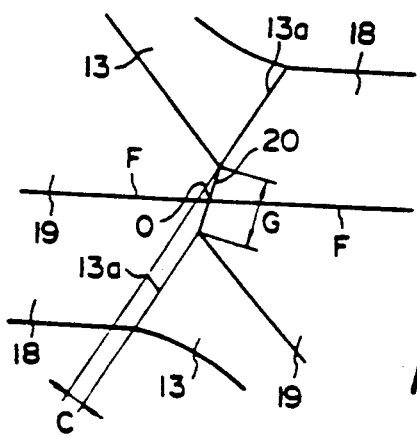
FIG. 17 is an enlarged view of a chisel portion of the drill of FIG. 12.

(8) Suppose an imaginary line extends along the ridgeline of one of the second cutting lips 13a. Then, in the embodiment, the intervening distance C between the imaginary line and the other second cutting lip 13a is 0 to 0.3 mm, and the chisel edge 20 is formed between adjacent ends of the two second cutting lips 13a. The width G of the chisel edge 20 is set to be 0 to 0.4 mm (FIG. 17).

The chisel edge 20 acts so as to separate the workpiece. If the chisel edge width G is great, the thrust load increases and the cutting speed increases at the ends of the chisel 20, so that the ends of the chisel are susceptible to chipping. Therefore, the chisel edge width G should be preferably near zero, so that the above disadvantage is avoided and stable engagement can be ensured by setting it to be no greater than 0.4 mm.

Figure 13:
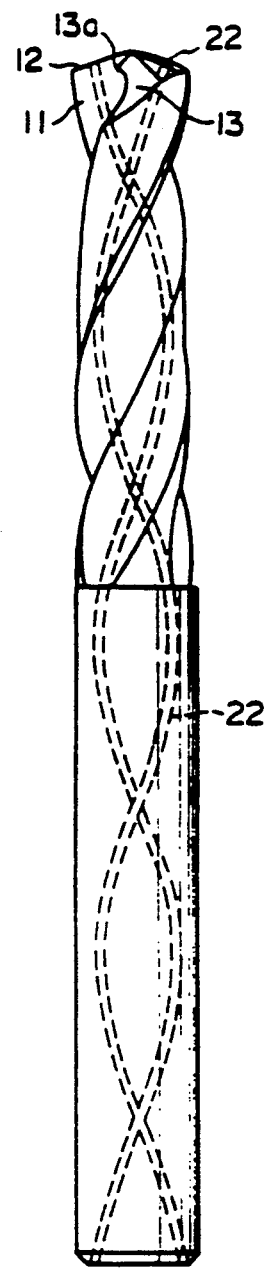
FIG. 13 is a side elevation of the drill of FIG. 11.

(9) An oil hole 22 for passage of a cutting fluid is formed through the drill body 10 so as to extend spirally along the spiral flutes 11 (FIG. 13).

With this construction, even after resharpening, the position of the oil hole 22 would remain unchanged, and hence cutting operation can be always conducted under the same conditions. In addition, inasmuch as the oil hole 22 is spiral, the torsional rigidity of the body 10 is barely lowered. Therefore, in combination with the effects due to the optimal range relating to the distance W, the drill can be used for heavier duty drilling operations. These advantages could also be expected even if the drill was provided with non-linear first and second cutting lips.

(10) The heel 11b, defined by the intersection of the flute 11 with the outer peripheral land 10a, is relieved to provide a chamfered face extending along the flute 11. This chamfered face is about 0.5 mm wide. Instead of chamfering, the heel may be rounded off so as to have a radius of curvature of about 0.5 mm. With either of these machinings, the heel can be prevented from being chipped or fractured by the chips produced during the drilling operation.

Figure 19:
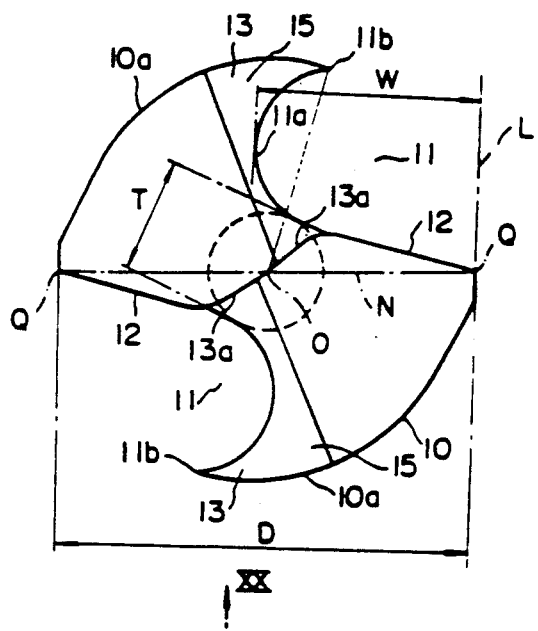
FIG. 19 is a forward end view of a further modified drill in accordance with a fourth embodiment of the present invention.
Figure 20:
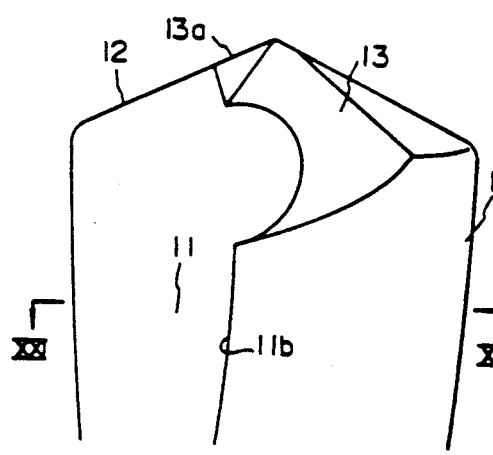
FIG. 20 is a side elevation of the drill of FIG. 19 as seen from the direction designated by XX in FIG. 19.
Figure 21:
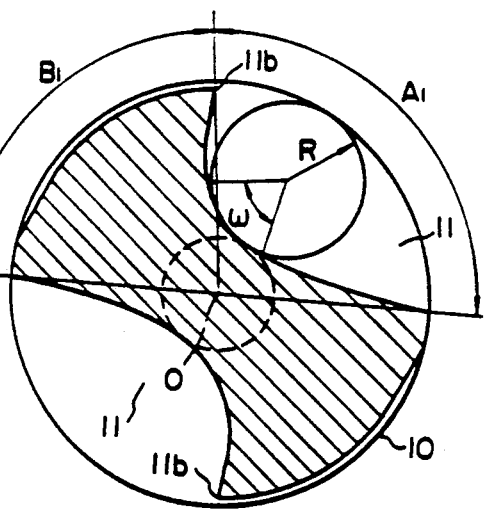
FIG. 21 is a cross-sectional view of the drill of FIG. 19 taken along the line XXI—XXI in FIG. 20.

FIGS. 19 to 21 illustrate a further modified twist drill in accordance with a fourth embodiment of the present invention. As is the case with the drill of the first embodiment, the drill body 10 is made of HSS or sintered metal HSS, and the web thickness T is set to be 15 to 30% of the drill diameter D. Those portions of flanks located rearwardly with respect to the direction of rotation of the body 10 are subjected to cross thinning as at 13 to provide X-type ground surfaces 15, and second cutting lips 13a each extending away from the axis O of rotation to the radially innermost end of a respective first cutting lip 12 are formed at the web portion. The distance W between the line L and the bottom 11a of the flute 11 is designed to range from 45% to 65% of the drill diameter D, so that the second wall of the spiral flute 11 is recessed deeply in the direction of rotation of the body 10. Furthermore, the entire surface of the drill body 10 is coated with a hard coating composed of at least one material selected from the group consisting of TiC, TiN, TiCN and Al$_2$O$_3$. In this drill, too, inasmuch as the distance W between the line L and the bottom 11a of the flute 11 is set to be no less than 45% of the drill diameter, the resistance exerted on the chip in the direction opposite to the direction in which the chip grows is divided into forces to cause the chip to bend or buckle. Accordingly, the chip is prevented from being strongly compressed, so that the thrust load and cutting torque can be greatly reduced.

Furthermore, in this embodiment, the ratio of arc length $A_1$ of the flute 11 to arc length $B_1$ of the land in a cross-section taken perpendicular to the axis O of the body 10, i.e., a flute-width ratio $A_1/B_1$ at a cross-section away from the forward end, is set to range between 0.9 and 1.2. That portion of the wall of the flute 11 which contacts an imaginary cylinder inscribing the web portion of the body 10 is concavely arcuately shaped at such a radius of curvature R as to satisfy the relationship: $0.15 D \leq R \leq 0.2 D$. The length of this arcuately-shaped portion, as viewed axially of the body 10, is defined by an arc with a central angle $\omega$ from 19° to 49°, preferably from 24° to 44°, and more preferably from 29° to 39°. Within this range of the central angle $\omega$, not only will a chip produced by the cutting lip 12 be curled positively, but also the friction between the chip and the wall of the flute 11 can be reduced, so that the curling of the chip can be smoothly effected.

As was the case with the first embodiment, the advantages of this embodiment were verified by way of the following drilling tests.

DRILLING TEST 3

There were prepared several twist drills, having various ratios of the distance W to the drill diameter, in accordance with the fourth embodiment of the invention. The test drill had a diameter of 12 mm and a point angle of 140°, and the radial rake angle of the cutting lip was $-15°$. Then the procedures, as set forth in Drilling Test 1 were repeated under the same conditions, and the thicknesses of chips produced during the drilling operation were measured. The results are shown in Table 3.

As seen from Table 3, when the distance W from the line L to the bottom 11a of the flute 11 is no less than 45% of the drill diameter, the thicknesses of chips are reduced substantially as was the case with the first embodiment, and hence the resistance exerted on the chip can be substantially reduced.

DRILLING TEST 4

The drill having the distance W of 53% of drill diameter and the drill having the distance W of 41% of drill diameter, which were prepared for Drilling Test 3, were again used, and the drilling tests were carried out under the same conditions as those in Drilling Test 1. In this test, the thrust load, cutting torque, cutting power and maximum amplitude of vibration of the spindle during the drilling operation were measured. The results are shown in Table 4.

It is seen from Table 4 that in the drill of the invention, the thrust load, cutting torque and cutting power are all reduced markedly in comparison with the prior art drill. Therefore, in the drill of this invention, since the chips can be curled without being compressed strongly, the resistance exerted on the chips can be reduced, so that the cutting resistance such as thrust load can be decreased substantially.

TABLE 3

| Feed rate (mm/rev.) | Thickness of chips (mm) | | | | |
|---|---|---|---|---|---|
| | Drills of the invention Ratio (%) | | | Prior art drills Ratio (%) | |
| | 53 | 50 | 45 | 43 | 41 |
| 0.15 | 0.257 | 0.289 | 0.301 | 0.426 | 0.451 |
| 0.25 | 0.349 | 0.370 | 0.391 | 0.523 | 0.546 |
| 0.35 | 0.420 | 0.438 | 0.466 | 0.635 | 0.661 |
| 0.45 | 0.511 | 0.523 | 0.550 | 0.761 | 0.790 |
| 0.55 | 0.646 | 0.657 | 0.657 | 0.954 | 0.991 |

TABLE 4

| | Feed rate (mm/rev.) | | | | |
|---|---|---|---|---|---|
| | 0.15 | 0.25 | 0.35 | 0.45 | 0.55 |
| Thrust load (Kg) | | | | | |
| Drill of the invention | 118 | 159 | 208 | 310 | 360 |
| Prior art drill | 220 | 284 | 350 | 418 | 485 |
| Cutting torque (Kg · mm) | | | | | |
| Drill of the invention | 78 | 115 | 156 | 240 | 271 |
| Prior art drill | 121 | 181 | 219 | 259 | 351 |
| Cutting power (Kw) | | | | | |
| Drill of the invention | 0.42 | 0.70 | 0.85 | 1.23 | 1.45 |
| Prior art drill | 0.71 | 1.23 | 1.41 | 1.59 | 2.05 |
| Amplitude of vibration of the spindle ($\mu$) | | | | | |
| Drill of the invention | 3.2 | 2.59 | 2.61 | 2.78 | 2.8 |
| Prior art drill | 3.7 | 5.41 | 2.87 | 4.21 | 5.98 |

Thus, in the twist drill in accordance with the above embodiment, the cutting resistance during the drilling operation can be reduced sufficiently. In addition, since the distance W between the line L and the bottom 11a of the flute 11 is set to be no greater than 65% of the drill diameter D, the thickness of the body 10 between the second wall of the flute disposed adjacent to the heel and the peripheral land will be adequate, so that the drill is less susceptible to chipping damage or cracking. In addition, the torsional rigidity of the drill can be maintained at a high level.

Moreover, since the chip is extended along the wall of the spiral flute 11 and curls at the bottom 11a, the radius of curvature of the chip becomes generally identical to the radius of curvature R of the bottom of the spiral flute 11 defined at the cross-section. If the radius of curvature R of the bottom exceeds 0.2 D, the chip protrudes radially outward from the flute 11 and is brought into frictional engagement with the wall of the drilled bore. As a result, the surface finish of the bore deteriorates and the chip removal efficiency is lessened. On the other hand, if the radius of curvature R is below 0.15 D, the radius of curvature of the chip is unduly reduced. For this reason, the bending resistance exerted on the chip increases and is added to the cutting resistance to increase the cutting torque and thrust load.

Additionally, since the surface of the drill body is coated with TiC, TiCN or the like, the wear resistance is sufficiently enhanced to enable heavy-duty operations to be performed.

Furthermore, since in the above drill, the cutting resistance is considerably reduced, the vibration of spindle of the machine tool can be rendered small enough for the working precision to be highly enhanced. Moreover, since the flute is so formed that the second wall is recessed deeply in the direction of rotation of the body, the cross-sectional area is large, and hence chips can be smoothly removed.

In this embodiment, too, the first cutting lip 12 and the second cutting lip 13a may be formed so that when viewed from the forward end of the body 10, they appear linear and the intersection 14 is arcuately shaped at a prescribed radius of curvature r. Furthermore, the various limitations such as described in the third embodiment could also be added to this embodiment.

Figure 22:
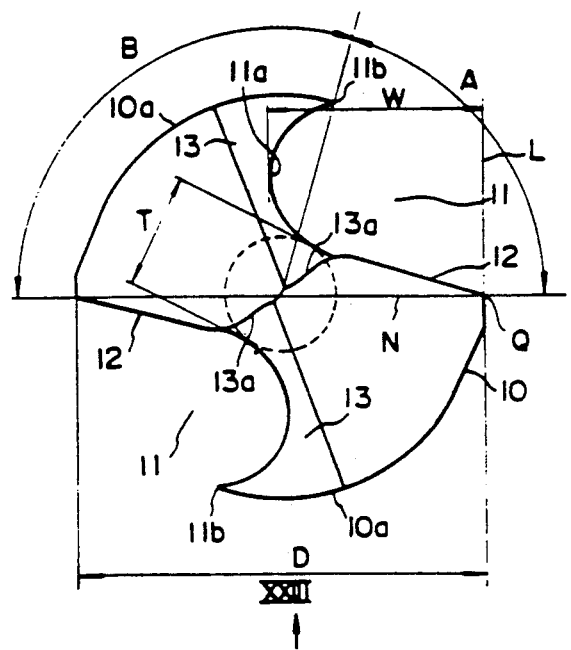
FIG. 22 is a forward end view of a further modified twist drill in accordance with a fifth embodiment of the present invention.
Figure 23:
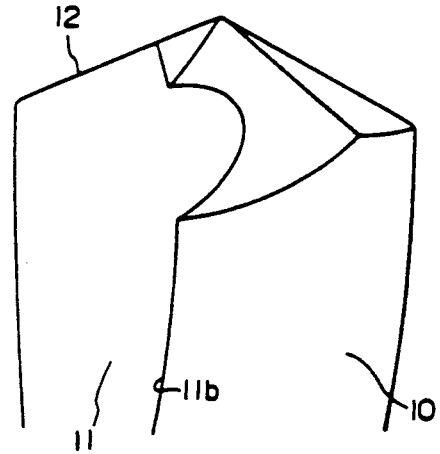
FIG. 23 is a side elevation of the drill of FIG. 22 as seen from the direction designated by XXIII in FIG. 22.

FIGS. 22 and 23 depict a further modified twist drill in accordance with a fifth embodiment of the present invention which differs from the drill of the previous embodiments in that the drill body 10 is made of cemented carbide, and that the body 10 has a web thickness T of 20 to 35% of the drill diameter D and a flute-width ratio A/B of 0.5 to 0.9. Additionally, the entire surface of the drill body 10 is not coated with a hard coating. Rather, only a portion of the surface of the drill body 10 may be coated with the hard coating.

In the twist drill as described above, too, the distance W between the line L and the bottom 11a of the flute 11 is set to be no less than 45% of the drill diameter, and hence the resistance exerted on the chip in the direction opposite to the direction in which the chip is extended is divided into forces to cause the ship to bend or buckle. Accordingly, the chip is prevented from being strongly compressed, so that the thrust load and cutting torque can be greatly reduced.

These points were verified by way of the following drilling tests:

DRILLING TEST 5

There were prepared several twist drills having various ratios of the distance W to the drill diameter. The test drill had a diameter of 12 mm and a point angle of 140°, and the radial rake angle of the cutting lip was −15°. The Drilling Test were conducted under the following conditions:
Cutting speed: 65 m/min.
Workpiece: Steel (JIS SCM440; Hardness: HB100 and 300 to 350)
Feed rate: 0.15, 0.25, 0.35, 0.45 and 0.55 mm/revolution The thicknesses of chips produced during the drilling operation using the drills were measured at a point designated by S in FIG. 5. Table 5 shows the results for the drilling of a workpiece with a hardness of 300 to 350 while Table 6 shows those for the drilling of a workpiece with a hardness of 100.

As seen from Tables 5 and 6, when the distance W from the line L to the bottom 11a of the flute 11 is no less than 45% of the drill diameter, the thicknesses of the chips are reduced substantially. This means that the resistance exerted on the chip can be substantially reduced by setting the distance W to be no less than 45% of the drill diameter.

TABLE 5

| Feed rate (mm/rev.) | Workpiece of Hardness 300-350 ||||| 
|---|---|---|---|---|---|
| | Thickness of chips (mm) |||||
| | Drills of the invention Ratio (%) ||| Prior art drills Ratio (%) ||
| | 53 | 50 | 45 | 43 | 41 |
| 0.15 | 0.131 | 0.134 | 0.142 | 0.195 | 0.203 |
| 0.25 | 0.218 | 0.223 | 0.237 | 0.322 | 0.338 |
| 0.35 | 0.275 | 0.283 | 0.301 | 0.412 | 0.425 |
| 0.45 | 0.353 | 0.364 | 0.383 | 0.527 | 0.545 |
| 0.55 | 0.431 | 0.446 | 0.471 | 0.642 | 0.667 |

| Feed rate (mm/rev.) | Workpiece of Hardness 100 ||||| 
|---|---|---|---|---|---|
| | Thickness of chips (mm) |||||
| | Drills of the invention Ratio (%) ||| Prior art drills Ratio (%) ||
| | 53 | 50 | 45 | 43 | 41 |
| 0.15 | 0.200 | 0.206 | 0.217 | 0.297 | 0.311 |
| 0.25 | 0.332 | 0.345 | 0.362 | 0.494 | 0.515 |
| 0.35 | 0.420 | 0.433 | 0.459 | 0.625 | 0.648 |
| 0.45 | 0.539 | 0.557 | 0.587 | 0.803 | 0.834 |
| 0.55 | 0.657 | 0.682 | 0.718 | 0.982 | 1.020 |

DRILLING TEST 6

The drill with the distance W of 53% of the drill diameter and the drill with the distance W of 41% of the drill diameter, which were prepared in Drilling Test 5, were again used, and the drilling tests were conducted under the same conditions as those in Drilling Test 5. In this test, the thrust load, cutting torque, cutting power and maximum amplitude of vibration of the spindle during the drilling operation were measured. The results are shown in Table 7 and 8.

It is seen from Tables 7 and 8 that in the twist drill of the invention, even though the radial rake angle is negative, the thrust load, cutting torque and cutting power are all reduced markedly in comparison with the prior art drill. Therefore, in the drill of this invention, since the chips can be curled without being compressed strongly, the resistance exerted on the chips can be reduced, so that the cutting resistance such as thrust load can be decreased substantially.

TABLE 7

| | Workpiece of Hardness 300-350 |||||
|---|---|---|---|---|---|
| | Feed rate (mm/rev.) |||||
| | 0.15 | 0.25 | 0.35 | 0.45 | 0.55 |
| Thrust load (Kg) | | | | | |
| Drill of the invention | 236 | 296 | 372 | 396 | 460 |
| Prior art drill | 288 | 332 | 400 | 480 | 580 |
| Cutting torque (Kg · mm) | | | | | |
| Drill of the invention | 96 | 128 | 168 | 204 | 240 |
| Prior art drill | 100 | 136 | 172 | 224 | 273 |
| Cutting power (Kw) | | | | | |
| Drill of the invention | 1.61 | 2.03 | 2.48 | 2.93 | 3.38 |
| Prior art drill | 1.76 | 2.18 | 2.63 | 3.15 | 3.75 |
| Amplitude of vibration of the spindle (μ) | | | | | |
| Drill of the invention | 1.98 | 2.22 | 2.16 | 2.88 | 2.52 |
| Prior art drill | 3.66 | 3.30 | 2.58 | 3.24 | 3.48 |

TABLE 8

| | Workpiece of Hardness 100 | | | | |
|---|---|---|---|---|---|
| | Feed rate (mm/rev.) | | | | |
| | 0.15 | 0.25 | 0.35 | 0.45 | 0.55 |
| Thrust load (Kg) | | | | | |
| Drill of the invention | 172 | 216 | 252 | 312 | 368 |
| Prior art drill | 230 | 280 | 350 | 460 | 550 |
| Cutting torque (Kg · mm) | | | | | |
| Drill of the invention | 84 | 112 | 148 | 188 | 220 |
| Prior art drill | 100 | 130 | 180 | 230 | 260 |
| Cutting power (Kw) | | | | | |
| Drill of the invention | 1.35 | 1.73 | 2.06 | 2.40 | 2.78 |
| Prior art drill | 1.63 | 2.00 | 2.53 | 3.08 | 3.45 |
| Amplitude of vibration of the spindle ($\mu$) | | | | | |
| Drill of the invention | 2.64 | 2.82 | 2.76 | 2.52 | 2.70 |
| Prior art drill | 2.9 | 3.0 | 3.6 | 4.3 | 3.9 |

Thus, in the twist drill in accordance with this embodiment, too, the cutting resistance during the drilling operation can be reduced. In addition, since the distance between the line L and the bottom 11a of the flute 11 is set to be no greater than 65% of the drill diameter D, the thickness of the body 10 between the second wall of the flute disposed adjacent to the heel and the peripheral land will be thick enough, so that the drill is less susceptible to chipping damage or cracking. In addition, the torsional rigidity of the drill can be maintained at a high level.

Furthermore, since in the above drill, the cutting resistance is considerably reduced, the vibration of spindle of the machine tool can be lessened, and the working precision is thereby highly enhanced. Moreover, since the flute is so formed that the second wall is recessed deeply in the direction of rotation of the body, the cross-sectional area is large, and hence chips can be easily removed.

Figure 24:
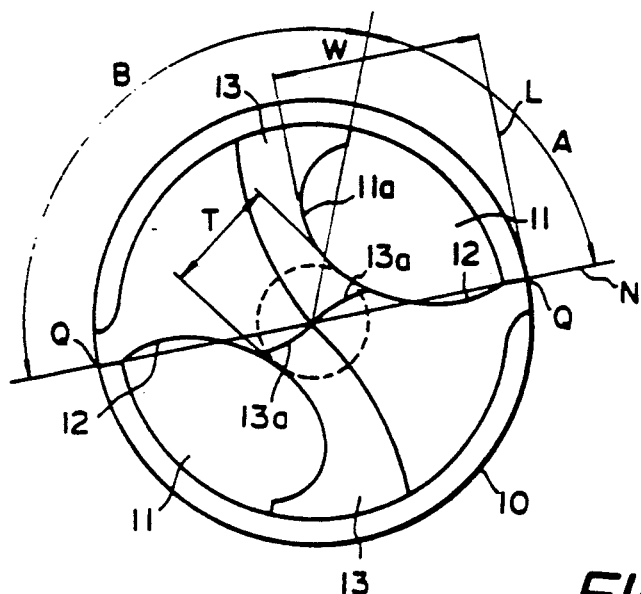
FIG. 24 is a view similar to FIG. 22, but showing a modification of the dill of FIG. 22.

In the above embodiment, the cutting lip 12 is formed so that it is located forwardly from the radial line N with respect to the direction of rotation of the body 10. It, however, may be disposed rearwardly from the radial line N in the direction of rotation of the body 10 as shown in FIG. 24.

Furthermore, the body 10 may be made of cermet. Generally, cermet is extremely hard and is superior in wear resistance, but it is more brittle and has less torsional rigidity in comparison to cemented carbide (the traverse rupture strength of cermet is 130 Kg/mm$^2$ while that of cemented carbide is 200Kg/mm$^2$), and hence it has been hitherto supposed to be inappropriate for use in drills. More specifically, if a drill is made of cermet, fatigue breakage readily develops when the drill is subjected repeatedly to cutting torque and thrust load, so that the drill is broken in a very short time. However, in the drill of this embodiment, the cutting torque and thrust load can be reduced while enhancing the torsional rigidity, and therefore the drill can be formed of cermet. These points were verified by way of the following drilling tests.

DRILLING TEST 7

Drills having the distance W of 53% of the drill diameter and the distance W of 41% of the drill diameter were made of cermet containing TiN, TiCN, and the like. The drilling tests were conducted under the following conditions. The drill diameter was 12.5 mm, and the point angle was 140°.

Workpiece: JIS SCM440 (Hardness: H$_{RC}$30)
Cutting speed: 50 m/min.
Feed rate: 0.3 mm/revolution In this test, the thrust load, cutting torque, cutting power and service life were observed. The results are shown in Tables 9 and 10, in which the term "cutting length" designates the summation of the thicknesses of all of the workpieces drilled by the test drill.

TABLE 9

| | Drill of the invention | Prior art drill |
|---|---|---|
| Thrust load (Kg) | 312 | 430 |
| Cutting torque (Kg · mm) | 166 | 180 |
| Cutting power (Kw) | 2.63 | 2.70 |
| Service life (cutting length) | Still unbroken at about 20 mm | Broken at about 7 m |

TABLE 10

| | Feed rate (mm/rev.) | | | | |
|---|---|---|---|---|---|
| | 0.15 | 0.20 | 0.25 | 0.30 | 0.35 |
| Thrust load (Kg) | | | | | |
| Drill of the invention | 232 | 248 | 300 | 312 | 348 |
| Prior art drill | 290 | 330 | 385 | 430 | 480 |
| Cutting torque (Kg · mm) | | | | | |
| Drill of the invention | 108 | 126 | 150 | 166 | 188 |
| Prior art drill | 115 | 140 | 155 | 180 | 220 |
| Cutting power (Kw) | | | | | |
| Drill of the invention | 1.97 | 2.18 | 2.44 | 2.63 | 2.93 |
| Prior art drill | 1.98 | 2.26 | 2.48 | 2.70 | 3.08 |
| Amplitude of vibration of the spindle ($\mu$) | | | | | |
| Drill of the invention | 3.0 | 2.2 | 2.0 | 2.1 | 2.22 |
| Prior art drill | 3.18 | 3.0 | 2.46 | 2.28 | 3.1 |

As seen from Table 9 that the twist drill of the invention could drill 20 m without any problems while the prior art drill was broken after it drilled only 7 m. This is because in the drill of the invention, even though the radial rake angle is negative, the thrust load, cutting torque, and cutting power are all reduced markedly in comparison with the prior art drill as will be seen from Table 10. Thus, the drill can be made of cermet, and this material has the advantage of superior wear resistance.

Figure 25:
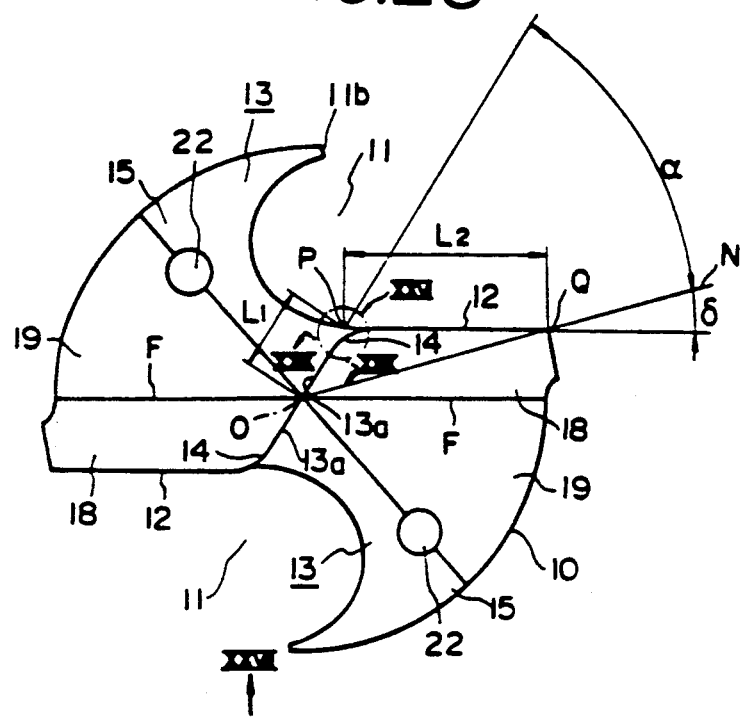
FIG. 25 is also a view similar to FIG. 22, but showing a further modification of the drill of FIG. 22.
Figure 26:
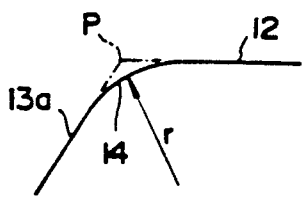
FIG. 26 is an enlarged view of the circled portion labeled XXVI in FIG. 25.
Figure 32:
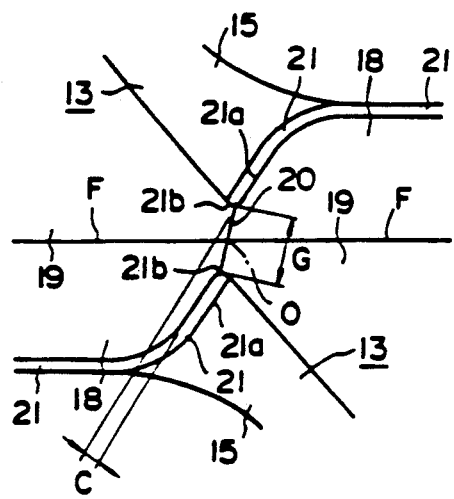
FIG. 32 is an enlarged view showing a chisel portion of the drill of FIG. 27.

In the above embodiment, both of the first cutting lip 12 and the second cutting lip 13a may be formed to be linear and to intersect each other with an arcuately shaped corner formed therebetween. FIGS. 25 and 26 illustrate such an embodiment, in which the radius of curvature r of the arcuate corner is set to range from 0.05 D to 0.15 D as is the case with the previous embodiments.

Moreover, the various features described in the third embodiment could as well be added to the drill of this embodiment as shown in FIGS. 27 to 33. In this embodiment, however, the angle a, defined as the angle between the second cutting lip 13a and the line N as viewed from the forward end of the body 10, should be set to range from 20° to 40°. The optimal ranges for the other parameters are identical to those in the third embodiment. Furthermore, the second cutting lip 13a and the first cutting lip 12 may be honed as at 21 in FIG. 32. When an imaginary line is drawn along an inner ridgeline 21a of the honing 21 of one cutting lip, the intervening distance C between the imaginary line and an inner ridge line 21a of the honing 21 of the other cutting lip is within the range of 0 to 0.3 mm, and a chisel edge 20 is formed between adjacent ends 21b of the two honings 21. If the honings 21 intersect at the axis, the engagement upon the drilling is caused at two points, so that the drill becomes susceptible to vibration and hence to chipping damage. For this reason, the adjacent ends of the honings 21b have to be spaced apart. The spacing C is set to be no greater than 0.3 mm in order to reduce the thrust load by reducing the chisel width G.

Figure 33:
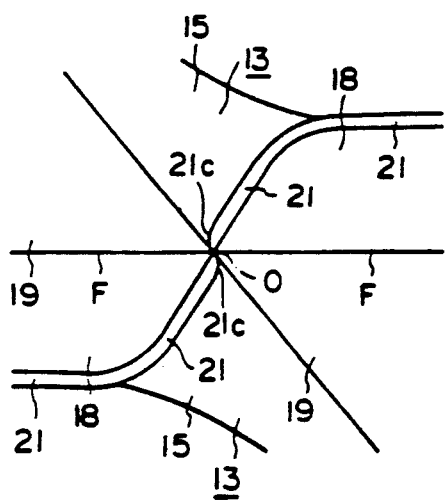
FIGS. 33 and 34 are views similar to FIG. 32, but showing further modifications of the chisel portion, respectively.
Figure 34:
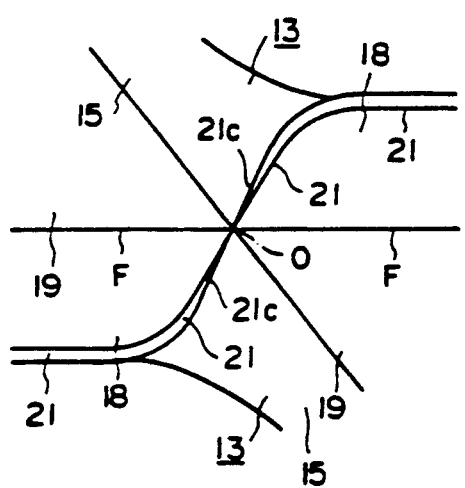

The adjacent ends 21b of the honings 21 may be disposed so as to almost contact each other, but the spacing therebetween must be maintained. FIG. 33 depicts a modification of the honing, in which the adjacent ends of the two honings are made to contact each other, but their outer ridgelines 21c are arcuately shaped in the vicinity of the axis O and intersect each other at the axis O. With this construction, although small, a chisel is formed at the axis O, so that the engagement with the workpiece can be conducted at one point. The configuration of the honing may be further modified as illustrated in FIG. 34, in which the width decreases as it approaches the axis. With this configuration, the chipping at the outer side of the second cutting lip 13a, where the cutting speed is great, can be prevented. Since the cutting lip 12 is straight, the variation in the configuration of the honing 21 is small. Furthermore, the the drill of cemented carbide or cermet, too, the body 10 may be coated with a hard coating of TiC, TiN, TiCN, $Al_2O_3$ or the like to enhance the wear resistance. This kind of coating also reduces friction between the drill and the chips, and further reduces cutting torque and thrust load.

Figure 35:
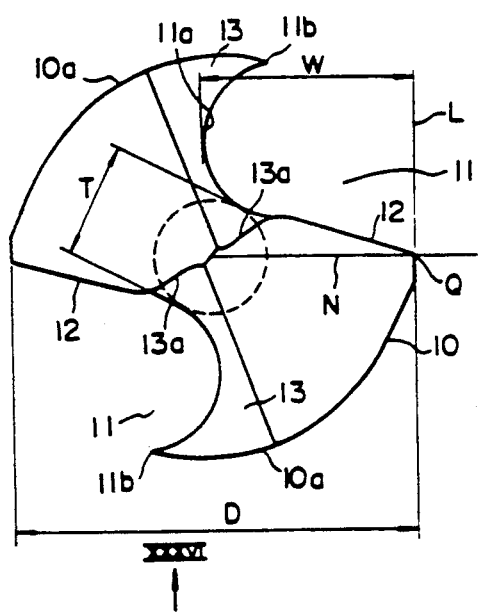
FIG. 35 is a forward end view of a further modified twist drill in accordance with a seventh embodiment of the present invention.
Figure 36:
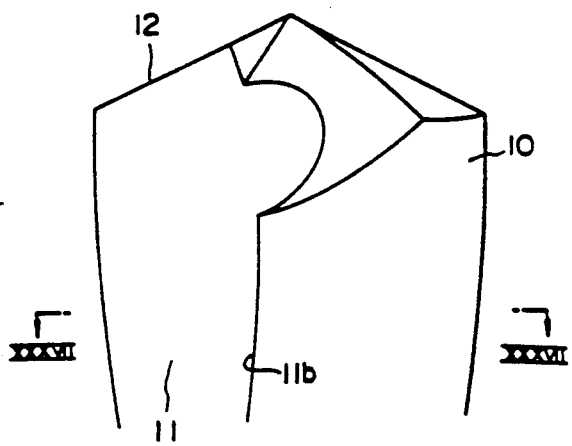
FIG. 36 is a side elevation of the drill of FIG. 35 as seen from the direction designated by the arrow XXXVI in FIG. 35.
Figure 37:
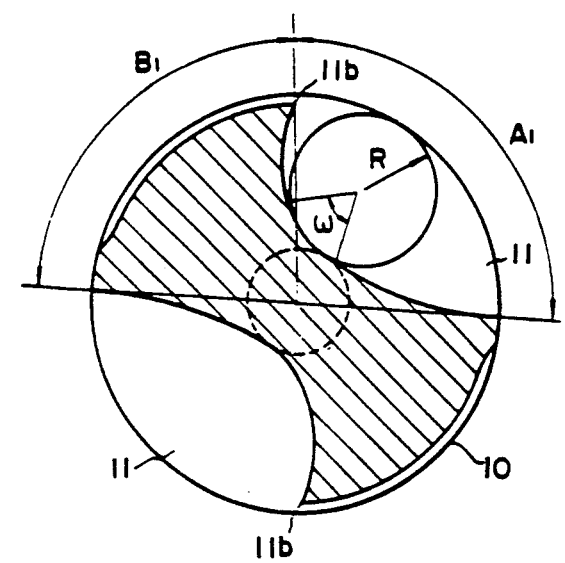
FIG. 37 is a cross-sectional view of the drill of FIG. 35 taken along the line XXXVII—XXXVII in FIG. 36.

FIGS. 35 to 37 depict a further modified twist drill in accordance with a seventh embodiment of the invention. As is the case with the drill of the fifth embodiment, the drill body 10 is made of cemented carbide or cermet, and the web thickness T is set to be from 20 to 35% of the drill diameter D. Those portions of flanks disposed rearwardly with respect to the direction of rotation of the body 10 are ground off, as at 13, to provide X-type ground surfaces 15, so that second cutting lips 13a, each extending away from the axis O of rotation to the radially innermost end of a respective first cutting lip 12, are formed at the web portion. The distance W between the line L and the bottom 11a of the flute 11 is designed to range from 45% to 65% of the drill diameter D, so that the second wall of the spiral flute 11 is recessed deeply in the direction of rotation of the body 10. Accordingly, in this drill, too, inasmuch as the distance between the line L and the bottom 11a of the flute 11 is set to be no less than 45% of the drill diameter, the resistance exerted on the chip in the direction opposite to the direction in which the chip grows is divided into forces to cause the chip to bend or buckle. Accordingly, the chip is prevented from being strongly compressed, so that the thrust load and cutting torque can be greatly reduced. Furthermore, in this embodiment, the flute-width ratio $A_1/B_1$ at a cross-section taken perpendicular to the axis O of the body 10 is set to range from 0.9 to 1.2. Additionally, that portion of the wall of the flute 11 which contacts an imaginary cylinder inscribing the web portion of the body 10 is concavely arcuately shaped at such a radius of curvature R as to satisfy the relationship: $0.15 D \leq R \leq 0.2 D$. The length of this arcuately shaped portion as viewed axially of the body 10 is defined by an arc with a central angle ω of 26° to 56°, more preferably of 31° to 51°, and most preferably of 36° to 46°. Within the range of the central angle ω, not only a chip produced by the cutting lip 12 is curled positively, but the friction caused between the chip and the wall of the flute 11 can as well be reduced, so that the curling of the chip can be smoothly effected.

As was the case with the first embodiment, the advantages of this embodiment were verified by way of the following examples.

DRILLING TEST 8

There were prepared several twist drills having various ratios of the distance W to the drill diameter. The test drill had a diameter of 12 mm and a point angle of 140°, and the radial rake angle of the cutting lip was −15°. The drilling tests were conducted under the the following conditions:

Cutting speed: 65 m/min.

Workpiece: Steel (JIS SCM440; Hardness: HB 100 and 300 to 350)

Feed rate: 0.15, 0.25, 0.35, 0.45 and 0.55 mm/revolution

The thicknesses of chips produced during the drilling operation using the drills were measured at a point designated by S in FIG. 5. Table 11 shows the results for the drilling of a workpiece with a hardness of 300 to 350 while Table 12 shows those for the drilling of a workpiece with a hardness of 100.

TABLE 11

| | Workpiece of Hardness 300–350 | | | | |
|---|---|---|---|---|---|
| | Thickness of chips (mm) | | | | |
| | Drills of the invention Ratio (%) | | | Prior art drills Ratio (%) | |
| Feed rate (mm/rev.) | 53 | 50 | 45 | 43 | 41 |
| 0.15 | 0.111 | 0.114 | 0.122 | 0.165 | 0.173 |
| 0.25 | 0.188 | 0.193 | 0.207 | 0.302 | 0.318 |
| 0.35 | 0.255 | 0.263 | 0.281 | 0.382 | 0.395 |
| 0.45 | 0.325 | 0.334 | 0.353 | 0.502 | 0.525 |

TABLE 11-continued

| | Workpiece of Hardness 300-350 | | | | |
|---|---|---|---|---|---|
| | Thickness of chips (mm) | | | | |
| | Drills of the invention Ratio (%) | | | Prior art drills Ratio (%) | |
| Feed rate (mm/rev.) | 53 | 50 | 45 | 43 | 41 |
| 0.55 | 0.411 | 0.426 | 0.457 | 0.612 | 0.637 | used, and the drilling tests were conducted under the same conditions as those in Drilling Test 8. In the test, the thrust load, cutting torque, cutting power and maximum amplitude of vibration of the spindle during the drilling operation were measured. The results are shown in Tables 13 and 14, in which Table 13 shows the results for the drilling of the workpiece with a hardness of 300 to 350 while Table 14 shows those for the drilling of the workpiece with a hardness of 100.

TABLE 13

| | Workpiece of Hardness 300-350 | | | | |
|---|---|---|---|---|---|
| | Feed rate (mm/rev.) | | | | |
| | 0.15 | 0.25 | 0.35 | 0.45 | 0.55 |
| Thrust load (Kg) | | | | | |
| Drill of the invention | 234 | 297 | 370 | 393 | 463 |
| Prior art drill | 288 | 332 | 400 | 480 | 580 |
| Cutting torque (Kg · mm) | | | | | |
| Drill of the invention | 93 | 122 | 165 | 201 | 246 |
| Prior art drill | 100 | 136 | 172 | 224 | 273 |
| Cutting power (Kw) | | | | | |
| Drill of the invention | 1.62 | 2.05 | 2.49 | 2.90 | 3.35 |
| Prior art drill | 1.76 | 2.18 | 2.63 | 3.15 | 3.75 |
| Amplitude of vibration of the spindle (μ) | | | | | |
| Drill of the invention | 1.95 | 2.33 | 2.09 | 2.85 | 2.55 |
| Prior art drill | 3.66 | 3.30 | 2.58 | 3.24 | 3.48 |

TABLE 7

| | Workpiece of Hardness 100 | | | | |
|---|---|---|---|---|---|
| | Feed rate (mm/rev.) | | | | |
| | 0.15 | 0.25 | 0.35 | 0.45 | 0.55 |
| Thrust load (Kg) | | | | | |
| Drill of the invention | 169 | 212 | 253 | 315 | 371 |
| Prior art drill | 230 | 280 | 350 | 460 | 550 |
| Cutting torque (Kg · mm) | | | | | |
| Drill of the invention | 82 | 113 | 151 | 182 | 223 |
| Prior art drill | 100 | 130 | 180 | 230 | 260 |
| Cutting power (Kw) | | | | | |
| Drill of the invention | 1.30 | 1.78 | 2.11 | 2.43 | 2.75 |
| Prior art drill | 1.63 | 2.00 | 2.53 | 3.08 | 3.45 |
| Amplitude of vibration of the spindle (μ) | | | | | |
| Drill of the invention | 2.61 | 2.78 | 2.72 | 2.50 | 2.68 |
| Prior art drill | 2.9 | 3.0 | 3.6 | 4.3 | 3.9 |

TABLE 12

| | Workpiece of Hardness 100 | | | | |
|---|---|---|---|---|---|
| | Thickness of chips (mm) | | | | |
| | Drills of the invention Ratio (%) | | | Prior art drills Ratio (%) | |
| Feed rate (mm/rev.) | 53 | 50 | 45 | 43 | 41 |
| 0.15 | 0.180 | 0.186 | 0.197 | 0.297 | 0.281 |
| 0.25 | 0.302 | 0.315 | 0.332 | 0.474 | 0.495 |
| 0.35 | 0.400 | 0.413 | 0.439 | 0.595 | 0.618 |
| 0.45 | 0.509 | 0.527 | 0.557 | 0.783 | 0.814 |
| 0.55 | 0.637 | 0.662 | 0.698 | 0.952 | 1.000 |

As will be seen from Tables 11 and 12, when the distance W from the line L to the bottom 11a of the flute 11 is no less than 45% of the drill diameter, the thicknesses of the chips are reduced substantially. This means that the resistance exerted on the chip can be substantially reduced by setting the distance W to be no less than 45% of the drill diameter.

DRILLING TEST 9

Drills having the distance W of 53% of the drill diameter and the distance W of 41% of the drill diameter, which were prepared for the Drilling Test 8, were again It is seen from Tables 13 and 14 that in the twist drill of the invention, even though the radial rake angle is negative, the thrust load, cutting torque, cutting power and amplitude of the vibration of the spindle are all reduced markedly in comparision with the prior art drill. Therefore, in the drill of this invention, since the chips can be curled without being compressed strongly, the resistance exerted on the chips is reduced, so that the cutting resistance such as thrust load can be decreased substantially.

Thus, in the twist drill in accordance with this embodiment, too, the cutting resistance caused during the drilling operation can be reduced sufficiently. In addition, since the distance between the line L and the bottom 11a of the flute 11 is set to be no greater than 65% of the drill diameter D, the thickness of the body 10 between the second wall of the flute disposed adjacent to the heel 11b and the peripheral land 10a can be sufficiently ensured, so that the drill is less susceptible to chipping damage or cracking. In addition, the torsional rigidity of the drill can be maintained at a high level.

Furthermore, since in the above drill, the cutting resistance is considerably reduced, the vibration of the spindle of the machine tool can be lessened, and the working precision is highly enhanced. Moreover, since the flute is so formed that that wall portion facing in the direction of rotation of the body is recessed deeply in the direction of rotation of the body, the cross-sectional area is large, and hence chips can be smoothly removed.

Figure 38:
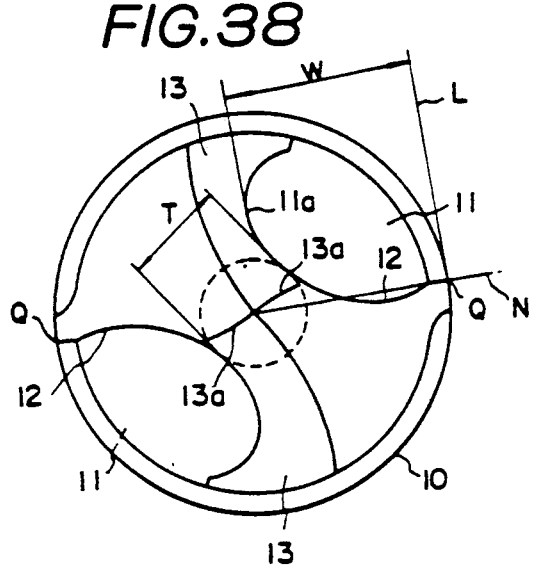
FIG. 38 is a view similar to FIG. 35, but showing a further modification of the drill of FIG. 35.

In the above embodiment, the cutting lip 12 is formed so that it is located forwardly from the radial line N with respect to the direction of rotation of the body 10. It, however, may be located rearwardly from the radial line N in the direction of rotation of the body 10 as shown in FIG. 38.

Furthermore, the body 10 may be made of cermet. The following is a drilling test similar to Drilling Test 7.

DRILLING TEST 10

The drill with the distance W of 53% of the drill diameter and the drill with the distance W of 41% of the drill diameter were made of cermet containing TiN, TiCN and the like, and the drilling tests were conducted under the following conditions. The drill diameter was 12.5 mm, and the point angle was 140°.

Workpiece: JIS SCM440 (Hardness: $H_{RC}30$)
Cutting speed: 50m/min.
Feed rate: 0.3mm/revolution In this test, the thrust load, cutting torque, cutting power and service life were observed, respectively. The results are shown in Tables 15 and 16.

As can be seen from Table 15, the twist drill of the invention could drill 20m without any problems while the prior art drill was broken after it drilled only 7m. This is because in the drill of the invention, even though the radial rake angle is negative, the thrust load, cutting torque, cutting power and amplitude of the vibration of the spindle are all reduced markedly in comparsion with the prior art drill as seen in Table 15. Thus, the drill can be made of cermet, and makes the best use of the property relating to the superior wear resistance.

TABLE

|  | Drill of the invention | Prior art drill |
|---|---|---|
| Thrust load (Kg) | 310 | 430 |
| Cutting torque (Kg · mm) | 162 | 180 |
| Cutting power (Kw) | 2.58 | 2.70 |
| Service life (cutting length) | Still unbroken at about 20 m | Broken at about 7 m |

TABLE 16

|  | Feed rate (mm/rev.) | | | | |
|---|---|---|---|---|---|
|  | 0.15 | 0.20 | 0.25 | 0.30 | 0.35 |
| Thrust load (Kg) | | | | | |
| Drill of the invention | 230 | 245 | 303 | 314 | 346 |
| Prior art drill | 290 | 330 | 385 | 430 | 480 |
| Cutting torque (Kg · mm) | | | | | |
| Drill of the invention | 105 | 123 | 152 | 168 | 189 |
| Prior art drill | 115 | 140 | 155 | 180 | 220 |
| Cutting power (Kw) | | | | | |
| Drill of the invention | 1.95 | 2.16 | 2.46 | 2.61 | 2.61 |
| Prior art drill | 1.98 | 2.26 | 2.48 | 2.70 | 3.08 |
| Amplitude of vibration of the spindle ($\mu$) | | | | | |
| Drill of the invention | 2.90 | 2.30 | 2.12 | 2.20 | 2.10 |
| Prior art drill | 3.18 | 3.00 | 2.46 | 2.28 | 3.10 |

The modifications described in the previous embodiments are also applicable to this embodiment although their explanations will be omitted for the sake of brevity.

Obviously, many modifications and variations are possible in the light of the above teachings. It is therefore to be understood that within the scope of the appended claims, the invention may be practiced otherwise than as specifically described.

What is claimed is:

1. A twist drill comprising: a cylindrical body including:
   an axis of rotation longitudinally therethrough;
   a forward end which contacts a workpiece;
   a web thickness of 0.2 D to 0.35 D, D being a diameter of said body; and
   a spiral flute formed in an outer peripheral surface of said body so as to extend spirally along a longitudinal length thereof to said forward end and a land disposed adjacent to said flute, said flute having:
   a first wall facing in a direction of rotation of said body and a second wall extending from an inner end of said first wall to the outer periphery of said body, said first wall terminating at said forward end in a first cutting lip having a radially outermost end disposed on the outer periphery of said body, said second wall being concavely shaped when viewed from said forward end formed so that, assuming a first line extending from said outermost end perpendicular to a second line connecting said outermost end and said axis of said body,
   the maximum distance between said first line and said second wall being set in a range between from 0.45 D to 0.65 D,
   the ratio of arc length of said flute to arc length of said land at a cross-section taken perpendicular to the axis of said body being 0.9 to 1.2,
   the wall of said flute having an arcuately shaped portion which contacts an imaginary cylinder inscribing a web portion of the drill, and
   said arcuately shaped portion, at a cross-section taken perpendicular to the axis of said body, having a radius of curvature of between 0.15 D and 0.2 D.

2. A twist drill according to claim 1, in which said second cutting lip is inclined at an angle of 20° to 40° with respect to the line extending from the axis of said body to said outermost end of said first cutting lip.

3. A twist drill according to claim 1, in which at least said forward end of said body is coated with a hard coating.

4. A twist drill according to claim 3, in which said hard coating is composed of at least one material selected from the group consisting of TiN, TiC, TiCN and $Al_2O_3$.

5. A twist drill according to claim 1, in which a web portion of the drill is ground off to provide a second cutting lip extending away from the axis of said body, each of first and second cutting lips being formed to be linear as viewed from said forward end.

6. A twist drill according to claim 5, in which said first cutting lip has a radial rake angle of −10° to −20° at said outermost end.

7. A twist drill according to claim 5, in which that corner at which said first cutting lip and second cutting lip meet forms a generally arcuately shaped edge when viewed from said forward end.

8. A twist drill according to claim 5, in which that corner at which said first and second cutting lips meet forms a sharp edge.

9. A twist drill comprising:
a cylindrical body including:
an axis of rotation longitudinally therethrough;
a forward end which contacts a workpiece;
a web thickness of 0.2 D to 0.35 D, D being a diameter of said body; and
a spiral flute formed in an outer peripheral surface fo said body so as to extend spirally along a longitudinal length thereof to said forward end and a land disposed adjacent to said flute, said flute having:
a first wall facing in a direction of rotation of said body and a second wall extending from an inner end of said first wall to the outer periphery of said body, said first wall terminating at said forward end in a first cutting lip having a radially outermost end disposed on the outer periphery of said body, said second wall being concavely shaped when viewed from said forward end formed so that, assuming a first line extending from said outermost end perpendicular to a second line connecting said outermost end and said axis of said body,
the maximum distance beween said first line and said second wall being set in a range between from 0.45 D to 0.65 D,
the ratio of arc length of said flute to arc length of said land at a cross-section taken perpendicular to the axis of said body being 0.9 to 1.2,
the wall of said flute having an arcuately shaped portion which contacts an imaginary cylinder inscribing a web portion of the drill,
said arcuately shaped portion having a radius of curvature of between 0.15 D and 0.2 D,
a web portion of the drill is ground off to provide a second cutting lip extending away from the axis of said body, each of first and second cutting lips being formed to be linear as viewed from said forward end,
that corner at which said first cutting lip and said second cutting lip meet forms a generally arcuately shaped edge when viewed from said forward end, and
the radius of curvature fo said arcuately shaped edged is between 0.5 D and 0.15 D.

10. A twist drill comprising:
a cylindrical body including:
an axis of rotation longitudinally therethrough; a forward end which contacts a workpiece;
a web thickness of 0.2 D to 0.35 D, D being a diameter of said body; and
a spiral flute formed in an outer peripheral surface of said body so as to extend spirally along a longitudinal length thereof to said forward end and a land disposed adjacent to said flute, said flute having:
a first wall facing in a direction of rotation of said body and a second wall extending from an inner end of said first wall to the outer periphery of said body, said first wall terminating at said forward end in a first cutting lip having a radially outermost end disposed on the outer periphery of said body, said second wall being concavely shaped when viewed from said forward end formed so that, assuming a first line extending from said outermost end perpendicular to a second line connecting said outermost end and said axis of said body,
the maximum distance between said first line and said second wall being set in a range between from 0.45 D to 0.65 D,
the ratio of arc length of said flute to arc length of said land at a cross-section taken perpendicular to the axis of said body being 0.9 to 1.2,
the wall of said flute having an arcuately shaped portion which contacts an imaginary cylinder inscribing a web portion of the drill,
said arcuately shaped portion having a radius of curvature of between 0.15 D and 0.2 D,
a web portion of the drill is ground off to provide a second cutting lip extending away from the axis of said body, each of first and second cutting lips being formed to be linear as viewed from said forward end,
said first cutting lip has a radial rake angle of −10 to −20 at said outermost end, and, when a point P is defined by the intersection of a line tangential to said first cutting lip with a line tangential to said second cutting lip, the ratio of a distance between said axis of said body and said point P to a distance between said outermost end of said first cutting lip and said point P is set to range between 0.4:1 and 0.7:1.

11. A twist drill according to claim 10, in which said forward end includes a first planar relief surface provided with a relief angle of 7° to 15° and extending along said first cutting lip, and a second planar relief surface provided with a relief angle greater than that of said first relief surface so as to range from 15° to 25° and extending along said first relief surface, the intersection of said first relief surface with said second relief surface being parallel to said first cutting lip and intersecting said axis of said body.

12. A twist drill according to claim 11, in which the axial rake angle for said second cutting lip is set to be between 0° and −5°.

13. A twist drill according to claim 12, in which the angle defined between a ground surface formed by the grinding and the rake surface along said second cutting lip is 95° to 115°.

14. A twist drill according to claim 13, in which the angle defined by said axis of said body and a valley line formed between said ground surface and said rake surface along said second cutting lip is set to be between 30° and 40°.

15. A twist drill according to claim 14, in which the axial distance between said outermost end of said cutting lip and a forward end of a heel is set to be between 0.3 D and 1.0 D.

16. A twist drill according to claim 15, further comprising an oil passageway formed in said body and extending spirally along said flute.

17. A twist drill according to claim 16, in which the intersection of the wall of said flute and the land of said body is honed to provide a honed face.

18. A twist drill according to claim 17, in which said honed face is a chamfered face.

19. A twist drill according to claim 17, in which said honed face is a rounded face.

20. A twist drill comprising:
a cylindrical body including:
an axis of rotation longitudinally therethrough;
a forward end which contacts a workpiece;
a web thickness of 0.2 D to 0.35 D, D being a diameter of said body; and
a spiral flute formed in an outer peripheral surface of said body so as to extend spirally along a longitudinal length thereof to said forward end and a land disposed adjacent to said flute, said flute having:
a first wall facing in a direction of rotation of said body and a second wall extending from an inner end of said first wall to the outer periphery of said body, said first wall terminating at said forward end in a first cutting lip having a radially outermost end disposed on the outer periphery of said body, said second wall being concavely shaped when viewed from said forward end formed so that, assuming a first line extending from said outermost end perpendicular to a second line connecting said outermost end and said axis of said body,
the maximum distance between said first line and said second wall being set in a range between from 0.45 D to 0.65 D,
the ratio of arc length of said flute to arc length of said land at a cross-section taken perpendicular to the axis of said body being 0.9 to 1.2,
the wall of said flute having an arcuately shaped portion which contacts an imaginary cylinder inscribing a web portion of the drill,
said arcuately shaped portion having a radius of curvature of between 0.15 D and 0.2 D,
a web portion of the drill is ground off to provide a second cutting lip extending away from the axis of said body, each of first and second cutting lips being formed to be linear as viewed from said forward end,
said second cutting lip being inclined at an angle of 20° to 40° with respect to the line extending from the axis of said body to said outermost end of said first cutting lip, and in which a pair of said first cutting lips and a pair of said second cutting lips are provided and honed, and in which, assuming a first imaginary line extending from an inner ridgeline of one of said honed second cutting lips and a second imaginary line extending from an inner ridgeline of the otheer honed second cutting lip, an intervening distance between said first and second imaginary lines is set to range between 0.0 to 0.3 mm, said honed second cutting lips defining a chisel edge therebetween.

21. An twist drill according to claim 20, in which said chisel edge has a width of between 0.0 and 0.4 mm.

* * * * *